US009740546B2

(12) United States Patent
Nagesharao et al.

(10) Patent No.: US 9,740,546 B2
(45) Date of Patent: Aug. 22, 2017

(54) COORDINATING FAULT RECOVERY IN A DISTRIBUTED SYSTEM

(71) Applicant: MICROSOFT TECHNOLOGY LICENSING, LLC, Redmond, WA (US)

(72) Inventors: Pavithra Tyamagondlu Nagesharao, Redmond, WA (US); Murtuza Rizvi, Redmond, WA (US); Sushant Pramod Rewaskar, Redmond, WA (US); Christopher P. Almida, Redmond, WA (US); Akram M. H. Hassan, Sammamish, WA (US); Ajay Mani, Woodinville, WA (US); Wakkas Rafiq, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/977,423

(22) Filed: Dec. 21, 2015

(65) Prior Publication Data

US 2016/0342450 A1    Nov. 24, 2016

Related U.S. Application Data

(63) Continuation of application No. 13/827,938, filed on Mar. 14, 2013, now Pat. No. 9,218,246.

(51) Int. Cl.
*G06F 11/00*   (2006.01)
*G06F 11/07*   (2006.01)
(Continued)

(52) U.S. Cl.
CPC ...... *G06F 11/0709* (2013.01); *G06F 11/0748* (2013.01); *G06F 11/0793* (2013.01);
(Continued)

(58) Field of Classification Search
CPC ..... G06F 11/2257; G06F 11/2294; G06F 8/65
See application file for complete search history.

(56) References Cited

U.S. PATENT DOCUMENTS 6,304,981 B1   10/2001 Spears et al.
6,400,195 B1    6/2002 Bhaskaran
(Continued)

FOREIGN PATENT DOCUMENTS

WO        9527249 A1    10/1995

OTHER PUBLICATIONS

"Final Office Action Issued in U.S. Appl. No. 13/827,938", Mailed Date: May 15, 2015, 12 Pages.
(Continued)

*Primary Examiner* — Charles Ehne
(74) *Attorney, Agent, or Firm* — Shook, Hardy & Bacon L.L.P.

(57) ABSTRACT

In various embodiments, methods and systems for coordinating, between a host and a tenant, fault recovery of tenant infrastructure in a distributed system is provided. A fault occurrence is determined for a tenant infrastructure in the distributed system. The fault occurrence may be a software failure or hardware failure of the tenant infrastructure supporting a service application of the tenant. A fault recovery plan is communicated to the tenant to notify the tenant of the fault occurrence and actions taken to restore the tenant infrastructure. It is determined whether a fault recovery plan response is received from the tenant; the fault recovery plan response is an acknowledgement from the tenant of the fault recovery plan. Upon receiving the fault recovery plan response or at the expiration of a predefined time limit, the fault recovery plan is executed to restore the tenant infrastructure.

20 Claims, 4 Drawing Sheets

(51) Int. Cl.
*G06F 11/14* (2006.01)
*G06F 11/22* (2006.01)
*G06Q 10/00* (2012.01)
*H04L 12/24* (2006.01)
*H04L 29/14* (2006.01)
*H04L 12/26* (2006.01)

(52) U.S. Cl.
CPC ...... *G06F 11/1415* (2013.01); *G06F 11/2257* (2013.01); *G06F 11/2294* (2013.01); *G06Q 10/00* (2013.01); *H04L 41/0654* (2013.01); *H04L 41/5025* (2013.01); *H04L 41/5096* (2013.01); *H04L 69/40* (2013.01); *H04L 43/0817* (2013.01)

(56) References Cited

U.S. PATENT DOCUMENTS

| | | | |
|---|---|---|---|
| 7,669,074 | B2 | 2/2010 | Chafle et al. |
| 7,916,627 | B2 | 3/2011 | Berkowitz et al. |
| 7,930,681 | B2 | 4/2011 | Kloeffer et al. |
| 8,230,256 | B1 | 7/2012 | Raut |
| 8,332,688 | B1 | 12/2012 | Tompkins |
| 2002/0162056 | A1 | 10/2002 | Forman et al. |
| 2003/0018821 | A1 | 1/2003 | Chow et al. |
| 2003/0188217 | A1 | 10/2003 | Spiegel |
| 2004/0064436 | A1* | 4/2004 | Breslin ............... G06Q 10/06 |
| 2004/0128186 | A1* | 7/2004 | Breslin ............ G06Q 10/06311 |
| | | | 705/7.13 |
| 2006/0112317 | A1 | 5/2006 | Bartolini et al. |
| 2006/0230309 | A1 | 10/2006 | Kromer et al. |
| 2007/0192155 | A1* | 8/2007 | Gauger ................. G06Q 10/00 |
| | | | 705/301 |
| 2010/0030626 | A1 | 2/2010 | Hughes et al. |
| 2011/0231696 | A1 | 9/2011 | Ji et al. |
| 2011/0258488 | A1 | 10/2011 | Nightingale et al. |
| 2012/0297236 | A1 | 11/2012 | Ziskind et al. |
| 2012/0331340 | A1 | 12/2012 | Birkler et al. |
| 2013/0339814 | A1 | 12/2013 | Rane et al. |

OTHER PUBLICATIONS

"Non-Final Office Action Issued in U.S. Appl. No. 13/827,938", Mailed Date: Dec. 15, 2014, 11 Pages.
"Notice of Allowance Issued in U.S. Appl. No. 13/827,938", Mailed Date: Aug. 26, 2015, 5 Pages.
"International Preliminary Report on Patentability Issued in PCT Application No. PCT/US2014/026407", Mailed Date: Jun. 1, 2015, 10 Pages.
"International Search Report and Written Opinion Issued in PCT Application No. PCT/US2014/026407", Mailed Date: Sep. 22, 2014, 12 Pages.
"International Search Report and Written Opinion Issued in PCT Application No. PCT/US2014/026407", Mailed Date: Jul. 22, 2014, 12 Pages.
"Second Written Opinion Issued in PCT Application No. PCT/US2014/026407", Mailed Date: Feb. 17, 2015, 7 Pages.

\* cited by examiner

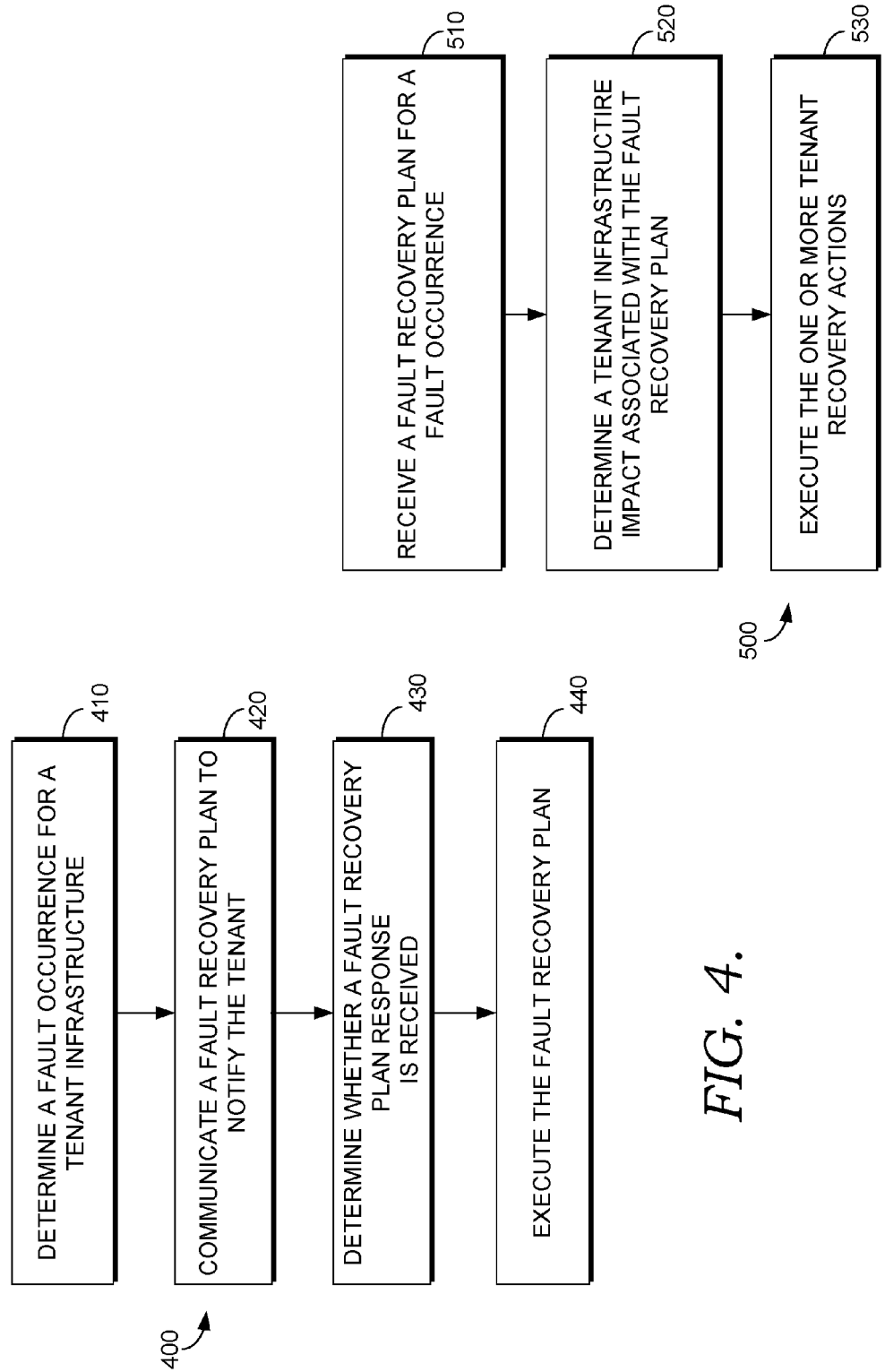

COORDINATING FAULT RECOVERY IN A DISTRIBUTED SYSTEM

CROSS-REFERENCE TO RELATED APPLICATIONS

This application is a continuation of, and claims priority to, U.S. patent application Ser. No. 13/827,938, filed Mar. 14, 2013, entitled "COORDINATING FAULT RECOVERY IN A DISTRIBUTED SYSTEM," which is incorporated herein by reference in its entirety.

BACKGROUND

Generally, distributed system service applications are hosted in cloud computing systems (across various nodes) and are intended primarily to share resources to achieve efficiency in a converged infrastructure of shared services. The distributed system infrastructure is associated with a tenant. The tenant refers to the customer/company (e.g., owner of service application) and/or the service-application components (e.g., tenant infrastructure or tenancy) associated to the customer/company. The service applications are often divided into portions that include a group of service-application components that include nodes (e.g., physical machines and virtual machines) of one or more data centers. Inevitably, service-application components of one or more instances of the service application fail and needs a fault recovery action to restore the service-application component. Often, the host—provider of the service application distributed system—takes fault recovery actions that affect the tenant. The impact to the tenant may include, among other things, unexpected disruption to the service application because the failure and subsequent host fault recovery actions are not intelligently communicated or coordinated between the host and the tenant.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method for coordinating fault recovery of tenant infrastructure in a distributed system. A fault occurrence is determined for a tenant infrastructure in the distributed system. The fault occurrence may be a software failure or hardware failure of the tenant infrastructure supporting a service application of the tenant. A fault recovery plan is communicated to the tenant to notify the tenant of the fault occurrence and actions taken to restore the tenant infrastructure. It is determined whether a fault recovery plan response is received from the tenant. The fault recovery plan response is an acknowledgement from the tenant of the fault recovery plan. Upon receiving the fault recovery plan response or at the expiration of a predefined time limit, the fault recovery plan is executed to restore the tenant infrastructure.

BRIEF DESCRIPTION OF THE DRAWINGS

The present invention is described in detail below with reference to the attached drawing figures, wherein:

FIG. 4 is a flow diagram showing a method for coordinating fault recovery of tenant infrastructure in a distributed system, in accordance with embodiments of the present invention; and FIG. 5 is a flow diagram showing a method for coordinating fault recovery of tenant infrastructure in a distributed system, in accordance with embodiments of the present invention.

DETAILED DESCRIPTION

Figure 1:
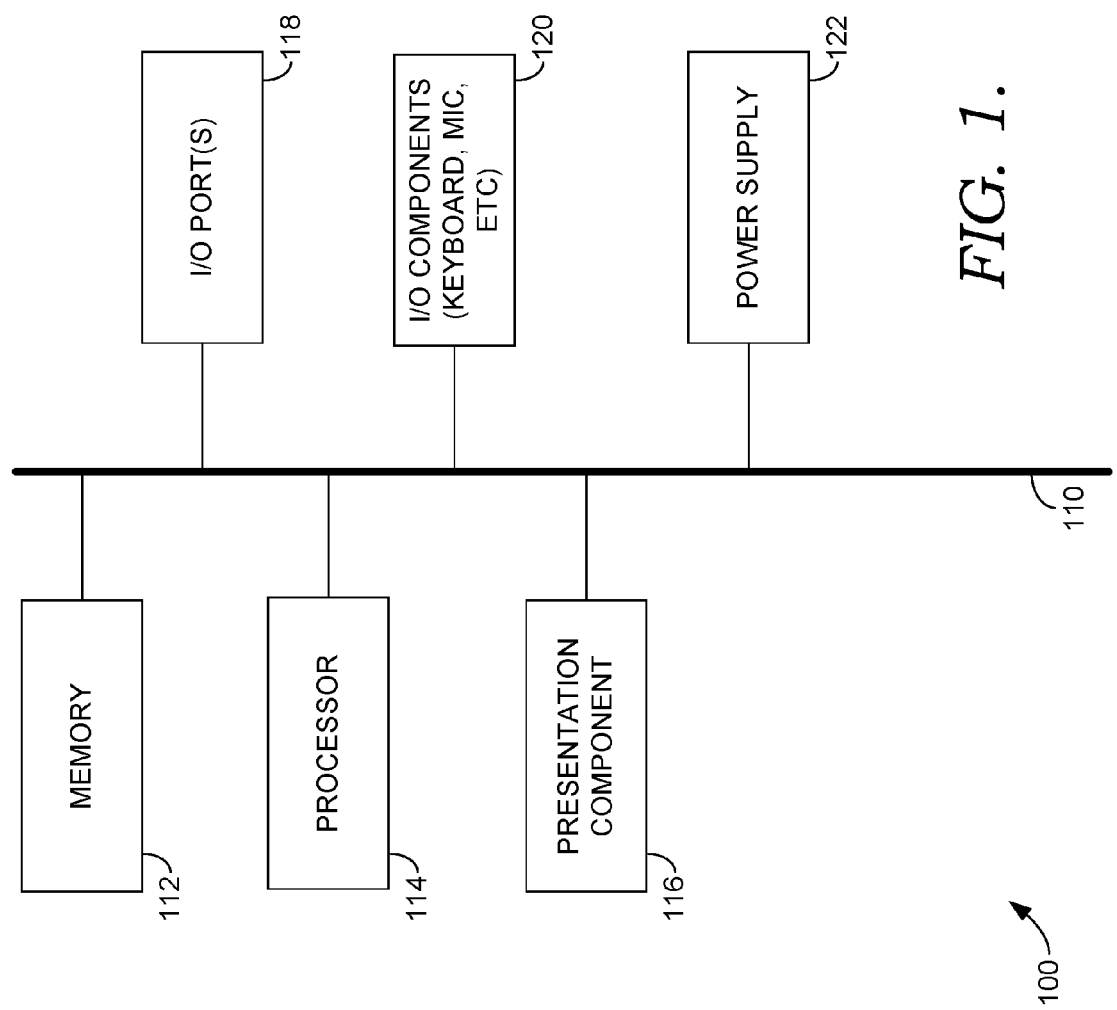
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a cloud computing distributed system with service applications running on service-application components. Further, while embodiments of the present invention may generally refer to the components described herein, it is understood that an implementation of the techniques described may be extended to other components performing the steps described herein.

Typically, a distributed system (e.g., cloud computing distributed system) acts to store data or run service applications in a distributed manner. For example, the service-application components (e.g., tenant infrastructure or tenancy) of the cloud computing distributed system may include nodes (e.g., computing devices, processing units, or blades in a server rack) that are allocated to run one or more portions of a tenant's service applications. When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. Generally, "roles" provide a template description of the functional portion of the service application. Roles are described by indicating the computer code implementing the role, the conditions within the hosting environment that are needed by the role, configuration settings to be applied to the role, and the role's set of endpoints for communication with other roles, elements, etc. In one instance, the role's configuration settings may include collective settings, which are shared by all instances of the role, or individual settings that are particular to each instance of the role.

In embodiments, a service model is employed to determine which attributes, or a set of attributes, are to be conveyed from the instances of the roles of the service application. As utilized herein, the phrase "service model" is not meant to be limiting and generally refers to any communication that includes information pertaining to establishing and managing instances of a service application within a data center. Generally, the service model is an interface blueprint that provides instructions for managing component programs of the service application. The service model acts to guide a fabric controller in coordinating activities between the deployed service applications and service-application components upon deployment to distributed locations throughout the distributed system. The fabric controller is generally responsible for various duties surrounding the monitoring, maintenance, and management of the health of computer resources, network gear, serial devices, and power units that support the underlying functionality of the fabric. The service model includes a description of which roles of the service application are to be established, or how the instances of each of the roles are to be installed and activated within the data center. That is, the service model serves as an articulation of which roles may be running for the service application and conditions for where instances of the roles may be installed through a cloud computing distributed system. Although various differing types of cloud configurations have been described, it should be understood and appreciated by those of ordinary skill in the art that other suitable structures of cloud computing distributed system may be used, and that embodiments of the present invention are not limited to those distributed service applications across virtual machines described herein.

The cloud computing distributed system provides for running service applications and storing data on machines in an internet-accessible data center. A cloud computing distributed system (e.g., WINDOWS AZURE cloud computing distributed system) through a host (e.g., cloud computing system) may provide a platform for running and storing data in the cloud. The implementation of the service application for a tenant (e.g., customer or company) may be a model environment or a customized environment configured as a service model. Whether implemented as a model environment or a customized environment, the cloud computing distributed system includes one or more roles, typically running multiple instances of each role, using load balancing across the instances of roles. The service-application components (e.g., tenant infrastructure) of a service application may be upgraded from time to time, which may be performed based on service level agreements with an upgrade policy or update policy agreed to between the host and the tenant. For example, an upgrade may be performed piece by piece across several roles in order to maintain high availability of service applications. In contrast to planned activities, such as upgrades, failures within the cloud computing distributed system are unplanned and unpredictable, thus requiring fault recovery actions to restore the service applications. For example, a failure may be a hardware failure that necessitates the node of the service application to be repaired or software failure that necessitates rebooting the virtual machine.

Generally, embodiments of the present invention introduce technology within the distributed system to automatically coordinate fault recovery in the distributed system. The distributed system is not meant to be limited to any particular configuration of service-application components, but broadly refers to any compilation of devices (e.g., network devices, computing devices, power-supply devices that may integrated within the fabric). For example, the distributed system may be located within a data center managed by a host where implementing the fault recovery process allows for restoring service applications of the tenant using the distribution system. In another instance, the distributed system is configured across a public cloud network and private cloud network and fault recovery actions are coordinated across the public cloud network and the private cloud network. In yet another instance, the distributed system may be located within a private enterprise network managed by an administrator of a distributed system supporting internal customers of the enterprise network, where implementing the fault recovery process allows for coordinating fault recovery actions between the administrator and internal customers. The coordination of fault recovery actions of the fault recovery process accounts for tenant considerations in fault recovery. For example, the tenant does not experience unexpected disruption of service applications as the fault recovery actions and the impact of the actions may be communicated to the tenant. In this regard, the tenant may be aware of any loss in service and respond with appropriate tenant recovery actions.

Communication for fault recovery of a tenant infrastructure may be facilitated by a management protocol that sets out the rules and format for communicating messages between the fabric controller (e.g. fabric controller—Management Role Control Protocol—MRCP) and the tenant (e.g. service application—Management Role—MR). Communications for fault recovery include communications between the host and the tenant. Tenant may refer to the customer or the service-application components associated to the customer. In this regard, communicating with the tenant may refer to communicating to a service-application component (e.g., management role, tenant recovery server, tenant console) which the tenant has access to. Similarly, communications from the tenant may refer to any communications from a service-application component of the tenant. As such, the service-application components of the tenant may be internal or external to a cloud computing distributed system of the service application. In this regard, the tenant may also receive a communication via a tenant console (e.g., an on-tenant-premises computing device) that connects to the tenant infrastructure.

In operation, the MRCP communicates with the MR upon detection of a fault occurrence in a tenant infrastructure (e.g., service-application component). The fabric controller may communicate a fault recovery plan that indicates the impact (e.g., role instances impacted) of the fault occurrence to the tenant. The fault recovery plan may also indicate the action taken (e.g., reboot, OS reimage, data reimage) to the impacted service-application component. The fabric controller may then either, wait for a fault recovery plan response from the tenant to commence fault recovery actions or commence after a predefined time limit with fault recovery actions to restore the tenant infrastructure. For instance, the fabric controller may determine a fault occurrence on a node with two virtual machines VM-1 and VM-2. The MRCP communicates to the MR that VM-1 and VM-2 will be rebooted, and as such, the tenant via the MR may take measures (e.g., tenant recovery actions) to accommodate for the loss of service. The MR may be installed on one or more nodes as multiple instances of a role. In embodiments, the service-application components affected by a failure may belong to two different tenants utilizing the same service-application component (e.g., node), as such, the fabric controller response plan accounts for both tenants and the fabric controller communicates with an MR associated with each tenant.

Accordingly, in a first aspect of the present invention, one or more computer-readable media storing computer-useable instructions that, when used by one or more computing devices, cause the one or more computing devices to perform a method for coordinating fault recovery of tenant infrastructure in a distributed system. The method includes determining a fault occurrence for a tenant infrastructure in the distributed system. The method also includes communicating a fault recovery plan to notify the tenant. The method further includes determining whether a fault recovery plan response is received. The fault recovery plan response is an acknowledgement from the tenant of the fault recovery plan. The method includes executing the fault recovery plan to restore the tenant infrastructure.

In a second aspect of the present invention, one or more computer-readable media storing computer-useable instructions that, when used by one or more computing devices, cause the one or more computing devices to perform a method for coordinating fault recovery of tenant infrastructure in a distributed system. The method includes receiving a fault recovery plan for a fault occurrence. The method also includes determining a tenant infrastructure impact associated with the fault recovery plan. The tenant infrastructure impact triggers one or more tenant recovery actions. The method includes executing the one or more tenant recovery actions.

In a third aspect of the present invention, a system for coordinating fault recovery of tenant infrastructure in a distributed system is provided. The system includes a controller component configured for determining a fault occurrence for infrastructure in the distributed system, wherein the fault occurrence is associated with a plurality of tenants. The controller component is also configured for communicating a fault recovery plan to notify each of the plurality of tenants. The controller component is further configured for determining whether a fault recovery plan response is received from each of the plurality of tenants. The fault recovery plan response is an acknowledgement from each of the plurality of tenants of the fault recovery plan. The controller component is configured for executing the fault recovery plan to restore the infrastructure. The system also includes a tenant component configured for receiving the fault recovery plan for the fault occurrence. The tenant component is configured for determining a tenant infrastructure impact associated with the fault recovery plan. The tenant infrastructure impact triggers one or more tenant recovery actions. The tenant component is also configured for communicating a fault recovery plan response. The tenant component is further configured for executing the one or more tenant recovery actions.

Having briefly described an overview of embodiments of the present invention, an exemplary operating environment in which embodiments of the present invention may be implemented is described below in order to provide a general context for various aspects of the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
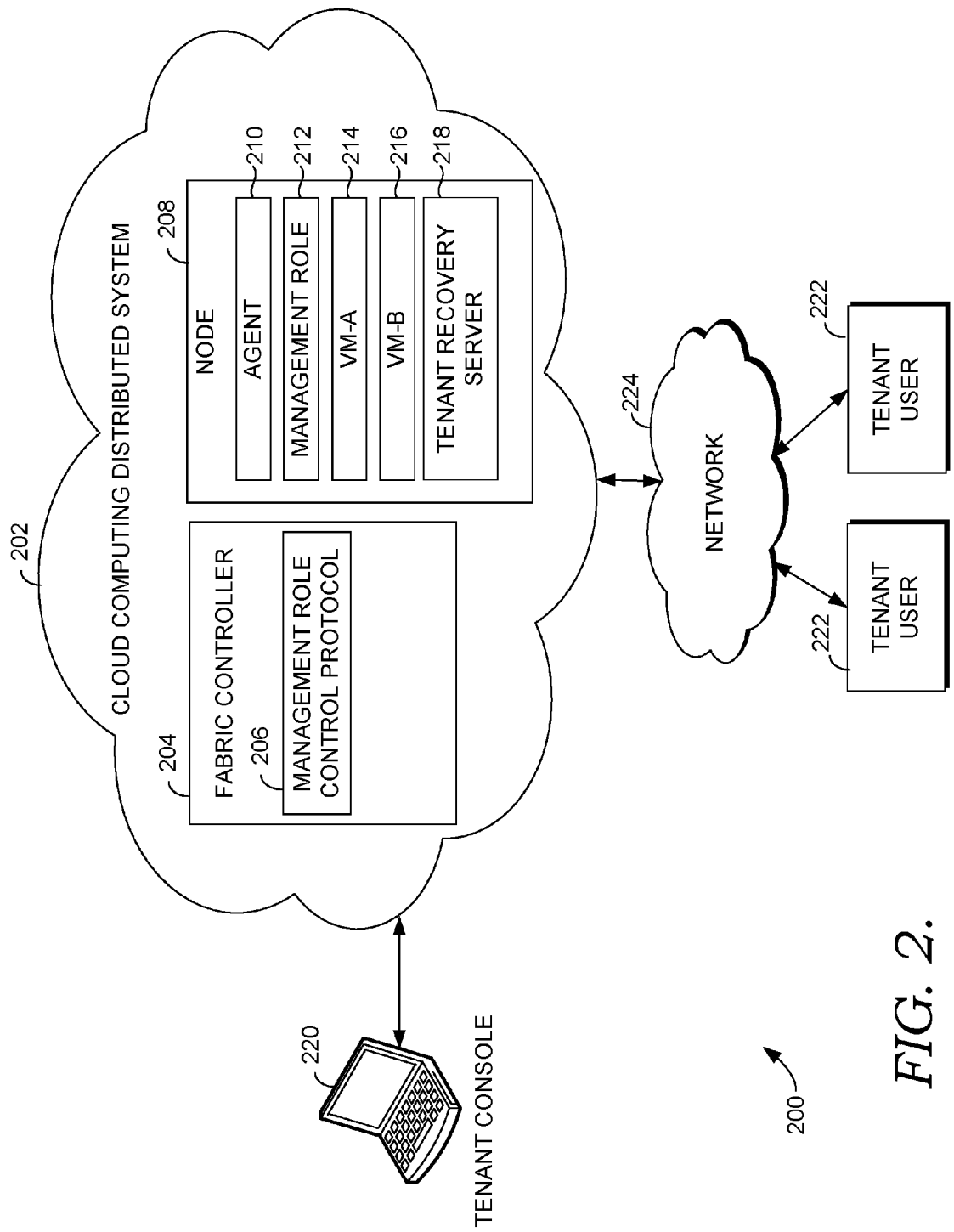
FIG. 2 is a block diagram of an exemplary network environment in which embodiments of the invention may be employed.

With additional reference to FIG. 2, a block diagram depicting an exemplary distributed system 200 suitable for use in embodiments of the invention described. Generally, the distributed system 200 illustrates an environment in which the coordination of a fault recovery process is enabled. In particular, embodiments of the present invention provide systems and methods for using a management protocol to coordinate, between a host and one or more tenants, fault recovery of service-application components. Among other components not shown, the distributed system 200 generally includes a cloud computing distributed system 202, a fabric controller 204 having a management role control protocol—MRCP 206, a node 208 having an agent 210, a management role MR 212, virtual machines VM-A 214 and VM-B 216, a tenant recovery server 218, a tenant console 220, and tenant users 222, all in communication with one another via a network 224. The network 224 may include, without limitation, one or more local area networks (LANs) and/or wide area networks (WANs). Such networking environments are commonplace in offices, enterprise-wide computer networks, intranets and the Internet. Accordingly, the network 224 is not further described herein.

Any number of fabric controllers, nodes, virtual machines, management roles, tenant consoles, and tenant users, may be employed in the distributed system 200 within the scope of embodiments of the present invention. Some components may comprise a single device/interface or multiple devices/interfaces cooperating in a distributed environment. For instance, the fabric controller 204 may comprise multiple devices and/or modules arranged in a distributed environment that collectively provide the functionality of the fabric controller 204 described herein. Additionally, other components/modules not shown also may be included within the distributed system 200.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, cloud computing distributed system 202 is part of a distributed system that acts to store data or run service applications in a distributed manner. For instance, the fabric controller 204 and the service-application components of the cloud computing distributed system 202 function to run one or more portions of a tenant's service applications. In particular, the fabric controller 204 is configured to deploy, manage, monitor and maintain service applications. The fabric controller 204 may perform maintenance of a service application associated with fault occurrences of service-application components (e.g. node 208). For example, the fabric controller 204 may handle software faults and hardware faults of the node 208. Generally, the fabric controller 204 manages all the resources in the cloud computing distributed system 202. The allocator (not shown) of the fabric controller 204 may decide where new service applications and restored service applications should run, choosing physical servers to optimize hardware utilization. The fabric controller 204 may depend on configuration information of each service application to make determinations on deployment of service applications. The configuration information may include information on the type and number of roles instances that may be deployed. The configuration information may also include service level agreements (e.g., contractual agreements between the host and the tenant on availability, serviceability, performance, operation, or other attributes of the service application).

Generally, communications from the fabric controller 204 may be facilitated by agent 210. The fabric controller may communicate with agent 210 on node 208 to remain aware of the health of the service application. The health of the service application may refer to issues with the service application performance, errors, updates, fixes, and registry that have caused or may likely cause a software or hardware failure. The fabric controller may monitor the running of a service application either as a function within the fabric controller 204 or through the MR 212 via agent 210. Detecting fault occurrences as a function of the fabric controller 204 may be facilitated by a fault handler (not shown) in the fabric controller 204. The fault handler may detect faults with the service application from the fabric controller, for example, the fabric controller may not be able to contact the agent 210 on the node 208 thus identifies a fault occurrence that may necessitate a reboot of the node 208. In the alternative, the fault handler of the fabric controller 204 may periodically poll the agent 210 to receive an up-to-date health report (e.g., tenant infrastructure health report) of a service application; as such the fault handler detects faults identified by the MR 212 running on the node 208. Additionally, for exemplary purposes, a service application that utilizes five role instances and one of them fails, the fabric controller may identify this as a fault occurrence and commence a fault recovery action to restore the role instance. Similarly, if the machine a VM is running on fails, the fabric controller may start a new instance on another machine, resetting the load balancer as necessary to point the new VM.

The fabric controller 204 may also be configured to generate a fault recovery plan that is communicated to the tenant. Communications between the fabric controller 204 and the MR 212 may facilitated by the MRCP 206. The fabric controller 204 may act through the MRCP 206 to restore service based on one tenant fault recovery plan at a time. In this regard, the fault recovery process guarantees high availability of a tenant's service application. For example, a tenant might have a first fault occurrence and a second fault occurrence that impact all the available role instances of the service application. The fault recovery plan addresses each fault occurrence at a time such that the tenant service application maintains availability. In embodiments, the fault recovery plan is communicated to the MR 212 via the tenant recovery server 218 as described further herein. In addition, the tenant console 220 may optionally be implemented as an on-tenant-premises computing device, external to cloud computing distributed system 202, but able to receive communications from the fabric controller 204 to an MR instance running at the computing device. For example, the tenant console 220 may have an endpoint agent configured to connect to the cloud computing distributed system using IPsec to interact with particular service-application components.

The fault recovery plan may indicate the impact (e.g., role instances impacted) to the tenant and the action taken (e.g., reboot, OS reimage, data reimage) to the impacted role instances. The fault recovery plan may factor service level agreements (e.g. contractual agreements on availability, serviceability, performance, operation, or other attributes of the service application) between the host and the tenant. The fabric controller 204 may then either, wait for a fault recovery plan response from the tenant to commence fault recovery actions or commence after a predefined time limit with fault recovery actions to restore service.

The fabric controller 204 is further configured to execute the fault recovery plan. The fault recovery plan may include fault recovery actions that are performed to restore the service application. The fault recovery actions may include in-place recovery actions. In-place recovery action may refer to actions performed without changing the location of the node. The in-place recovery action may include rebooting a node or a virtual machine, reimaging an operating system on the node or virtual machine or a repair (data reimage) of the node or virtual machine. It should be understood that other variations and combinations of in-place recovery actions are contemplated within the scope of embodiments of the present invention. Upon completion of the fault recovery actions, the fabric controller 204 may send a post-notification that include a request for a health report of the service application and/or service component from the MR 212. In embodiments, the fabric controller 304 may receive the health report that triggers one or more post recovery actions. For example, the health report may trigger the fabric controller 204 to begin resetting the load balancer for the role instances brought back to service or begin a different fault recovery plan for another fault occurrence.

The node 208 in the cloud computing distributed system 202 hosts service-application components (e.g., agent 210, MR 212, VM-A 214, VM-B 216 and tenant recovery server 218). Generally, when one or more service applications are being supported by nodes, the nodes may be partitioned into virtual machines (e.g., VM-A 214 and VM-B 216) with a plurality of role instances that concurrently run the one or more service applications. The agent 210 may be configured to act as an intermediary in communications between service-application components and the fabric controller 204. The agent 210 may communicate with the fabric controller 204, the health of the service application (e.g. virtual machines) and notifications (e.g., pre-notifications and post-notifications) associated with fault recovery process. The agent 210 may communicate with the MR 212 when the MR 212 assesses the health of the service application, which is then communicated to the fabric controller 204. The agent 210 may communicate to the tenant recovery server 218 notifications communicated from the fabric controller and then also communicate responses to the notifications from the tenant to the fabric controller 204.

The node 208 may also include VM-A 214 and VM-B 216 virtual machines running one or more role instances (not shown). Each role may have a designated function, for example, a web role, or a worker role. VM-A 214 and VM-B 216 may run to support the same or different service applications. Similarly, VM-A 214 and VM-B 216 may run to support the same or different tenants. VM-A 214 and VM-B 216 may be associated with an MR 212 to support the fault recover process. In particular, the MR 212 is configured to communicate messages, using the management protocol, to coordinate with the MRCP 206 of the fabric controller 204 the fault recovery process. The MR 212 may be configured as a type of tenant role. Advantageously, the MR 212 may be implemented as multiple instances distributed across multiple nodes to provide redundancy. Any one instance of the MR 212 may communicate with the fabric controller, and the fabric controller may be configured to accept the first communicated response from an MR instance as the determinative response. It is contemplated within embodiments of the present invention that a multiple MR implementation may entail communication between the MR instances to provide a coordinated fault recovery plan response and consistent fault recovery actions. For example, if an MR instance responds to the fault recovery plan, it may automatically communicate to the other instances that it has performed this action.

The MR 212 may also be configured to assess the health of the service application and communicate the health to the fabric controller 204. Each service application may be associated with an MR 212. It is contemplated that within the node 208 the virtual machines and role instances may be associated with a service application of one tenant or different tenants. In this regard, fault recovery actions performed on the node 208 may impact just one tenant, when only one tenant is associated with the node, or multiple tenants if multiple tenants are associated with the node. The MR 212 associated with a service application of the tenant is responsible for communicating the fault recovery action that may be taken on service-application components to the tenant. The MR 212 may also communicate with the tenant recovery server to receive notifications from the fabric controller 204 on fault recovery actions for a fault occurrence. In embodiments, the MR 212 communicates with the tenant console 220 to communicate relevant information on the service-application components.

The MR 212 may receive communications of a fault recovery plan initiated in the cloud computing distributed system, where the fault recovery plan is initiated to restore a service application of the tenant. The fault recovery plan communication may include a fault recovery action, generated based on a fault occurrence (e.g. software failure or hardware failure). The fault recovery plan may also include a predefined time limit for which the MR 212 may respond to the fault recovery plan, such that the fault recovery action may commence. The MR 212 may receive the fault recovery plan communication and make a determination of the impact of the fault recovery plan on the tenant users 222. The tenant users 222 may be businesses or consumers accessing the service application on the cloud computing distributed system 202. The impact of the fault recovery plan may include disruption of service, overloading of available resources, denial of service, and data loss.

The MR 212 may further be configured to trigger tenant recovery actions to accommodate the impact (e.g., the tenant infrastructure impact) of the fault recovery plan. The tenant recovery actions may be an automated recovery action or a manual recover action taken as a result of determining the impact of the fault recovery plan. The tenant recovery actions may be based on the tenant's operation policies including service level agreements with the tenant users 222. The tenant operation policies may include any rules or guidelines developed to accommodate fault recovery impact (e.g., communicating notice of loss of service to tenant users 222) or service level agreements (e.g. contractual agreements on availability, serviceability, performance, operation, or other attributes of the service application) that might inform the tenant's recovery actions. The tenant recovery actions may occur before and/or after the fault recovery plan is performed at the cloud computing distributed system 202. The MR 212 may also be configured to communicate a response (e.g. a fault recovery plan response) to the cloud computing distributed system 202 within the predefined time limit in the fault recovery plan.

The node 208 may further include a tenant recovery server 218 that is configured to facilitate communication between the fabric controller 204 and the MR 212 associated with the service application. In embodiments, the tenant recovery server 218 may also communicate with the service application tenant via the tenant console 220. The tenant recovery server 218 may receive notifications and store notifications from the fabric controller 204 about fault recovery actions for a fault occurrence. The tenant recovery server 218 may communicate with the fabric controller 204 via the agent 210 on the node 208. The notifications may include pre-notifications and post-notifications for the fault recover process. Pre-notifications (e.g., a fault recovery plan for a fault occurrence) communicate to the tenant recovery server 218 fault recovery actions that will be taken to restore service and post-notifications communicate to the tenant recovery server 218 that the fault recovery actions have been taken. The tenant recovery server 218 may communicate the stored notifications to the MR 212 of a service application when the MR 212 polls the tenant recovery server 218 for new notifications. A post-notification may request the health of the service application from the MR 212. In embodiments, the tenant recovery server 218 may communicate with a tenant console 220 during the fault recovery process. The tenant recovery server 218 may communicate fault recovery actions to the tenant console 220 and the tenant console 220 may communicate a response to the fault recovery actions.

The tenant console 220 may include any type of computing device, such as the computing device 100 described with reference to FIG. 1, for example. Generally, the tenant console 220 is associated with a service application running on the node 208. The tenant console 220 may be an on-tenant-premises computing device, external to cloud computing distributed system 202 but able to receive communications. In embodiments, the tenant console may include a redundant implementation of an MR instance. In this regard, the tenant console 220 may receive communications of a fault recovery plan initiated in the cloud computing distributed system, where the fault recovery plan is initiated to restore a service application of the tenant. Whether implemented as an MR instance external to the cloud computing distributed system 202 or a monitoring device for receiving communications, the tenant console 220 may be configured as automaton, a self-operating computing device designed to take actions upon identification of a fault occurrence and the generation of a fault recovery plan. The tenant console 220 may also support the manual recovery actions generated by an MR in response to a fault recovery plan. For example, the tenant console may be monitored by a system administrator of the tenant and as such perform any defined manual recovery actions associated with a fault occurrence.

An exemplary implementation of an embodiment of the present invention may include the MR 212 receiving a pre-notification of a reboot of a virtual machine of the tenant service application. The reboot needs about 15 minutes of downtime. The MR 212 may determine that the 15 minutes may cause an overload of the active running virtual machines not impacted by the fault recovery action of pre-notification. The impact determination may trigger a denial of use action of the service application to new tenant users until the fault recovery action is taken and a post-notification of a healthy service application, i.e. the service application performing normally, is received. The MR 212 may communicate to the fabric controller 204 a response during the predefined time limit to inform the fabric controller 204 to commence the fault recovery action.

Figure 3:
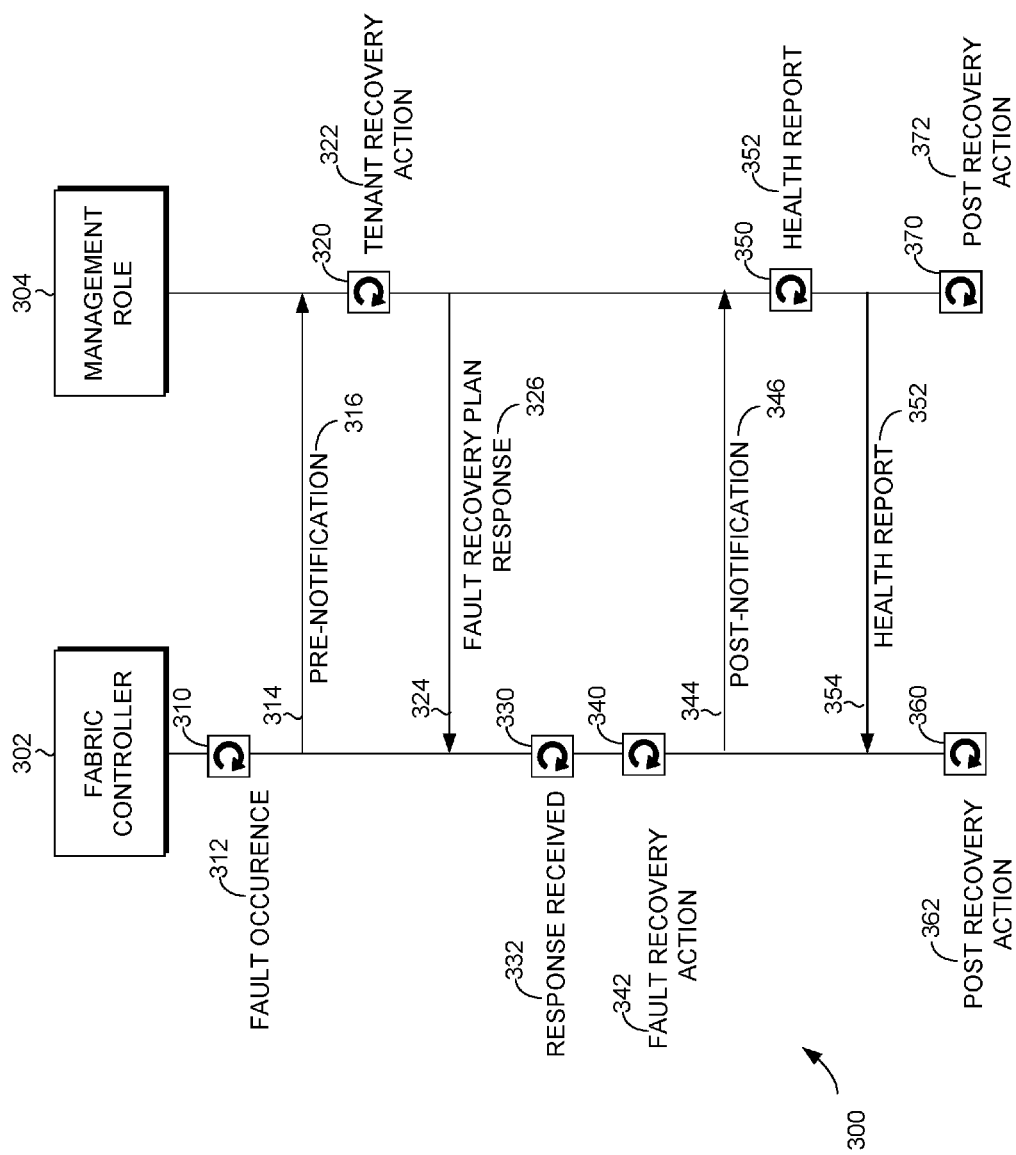
FIG. 3 is a schematic diagram showing a method for coordinating fault recovery of tenant infrastructure in a distributed system, in accordance with embodiments of the present invention.

Turning now to FIG. 3, a flow diagram depicts a method 300 for coordinating, between a host and tenant, fault recovery of tenant infrastructure in a distributed system. Initially, the components illustrated in FIG. 3 include a fabric controller 302 and a management role 304. It is contemplated within embodiments of the present invention that the fabric controller 302 may include an allocator, fault handler and a management role control protocol configured to perform functions as described above. Further, embodiments may also include a node having an agent, tenant recovery server, and a tenant console also performing functions as described above. As such, the present embodiment described with reference to FIG. 3 is provided as one of many possible arrangements of a cloud computing system for implement the present invention. It should be understood that this arrangement is set forth as an example.

The fabric controller 302 may detect 310 a fault occurrence 312. The fabric controller 302 may detect 310 the fault occurrence 312 via a fault handler at the fabric controller (e.g. the fault handler identifying that the agent crashed or the agent in not responsive) or via an agent of a node (e.g. the agent receiving an unhealthy infrastructure report from a management role associated with a service application). The fault occurrence 312 may be hardware failure or software failure at a node, such that, a fault recovery action to restore service may be necessary. The fabric controller 302 may communicate 314 a pre-notification 316 to the management role 304. The pre-notification 316 may comprise a fault recovery plan for the service-application components (e.g. nodes or virtual machines running one or more role instances) impacted by the fault occurrence and the fault recovery action taken to restore the service-application component. The fault recovery plan may include a pre-defined time limit to receive a response from the tenant console 306. The predefined time may be based on an agreed time limit between the host and the tenant, such that, the tenant may have enough to prepare for the loss in service. The fault recovery action may also include an in-place recovery action in that the action is performed without changing the location of the node. The in-place recovery action may include rebooting a node or a virtual machine on a node, reimaging operating system on the node or virtual machine, or reimaging data on a node or virtual machine. The fault recovery plan may account for service level agreements between the host and the tenant. For example, the fault recovery plan may defer a fault recovery action or change from a reimage fault recovery action to a reboot fault recovery action if one action is more aligned with the terms of the service level agreement.

The management role 304 receives the pre-notification 316. It is contemplated within embodiments of the present invention that the management role 304 may receive the pre-notification 316 via an agent and a tenant recovery server as described above. The management role 304 communicates with the fabric controller 302 based on a management protocol that provides the rules and guidelines for sending messages for the fault recovery process. The management role 304 may assess 320 the impact of the fault recovery plan and trigger tenant recovery actions 322 that assist in enduring the fault recovery plan. The tenant recovery actions 322 may be automated actions or manual actions that may have been, at least in part, predefined to respond to fault occurrences. The automated tasks may include services scheduled to run depending on the type of fault occurrence while manual tasks may entail deliberate action from a tenant entity (e.g. a system administrator). The tenant recovery actions 322 may account for service level agreements between the tenant console 306 and its users or customers. The pre-notification 316 communication may include a predefined time limit for when the tenant console 306 may respond to the pre-notification 316. The management role 304 may respond 324 to the pre-notification 316 within the predefined time limit with a fault recovery plan response 326. It is further contemplated that the fault recovery plan response 326 may be received via a series of intermediary service-application components (e.g. agent, tenant recovery server).

The fabric controller 302 may make a determination 330 whether a response 332 has been received. In embodiments, the fault occurrence may be on a node associated with multiple tenants, in this regard, the fabric controller 302 may wait until receiving a fault recovery plan response from each tenant or until the predefined time limit expires to begin executing the fault recovery plan. Upon execution 340 of the fault recovery plan by performing fault recovery actions 342, the fabric controller 302 may communicate 344 a post-notification 346 (e.g., post fault recovery notification) to the management role 304. The post-notification 346 may include the details of the fault recovery actions 342 and may also include a request to the management role 304 for a health report of the service application and/or service-application component associated with the fault recovery actions 342. The management role 304 is configured to assess 350 the health of the service application and its associated service-application components (e.g. virtual machines and roles instances running on the virtual machine) and generate a health report 352 (e.g. tenant infrastructure health report). The management role 304 may communicate 354 the health of the service application to the fabric controller 302. The fabric controller 302 may carry out 360 fabric controller post recovery actions 354 based on receiving the health report 352. The management role 304 may also carryout 370 tenant post recovery actions 372 based on generating the health report 352. For example, the management role 304 may turn off a denial of service notification to the users and customers of the service application, which had been triggered when the pre-notification of the fault occurrence was communicated to the tenant.

Turning now to FIG. 4, a flow diagram is provided that illustrates a method 400 for coordinating fault recovery of tenant infrastructure in a distributed system. At block 410, a fault occurrence for a tenant infrastructure in the distributed system is determined. The fault occurrence may be determined based on monitoring the tenant infrastructure. It is contemplated that the fault occurrence may also be determined based on a communication from a tenant role (e.g., management role). At block 420, a fault recovery plan is communicated to notify the tenant of the fault occurrence. The fault recovery plan includes one or more service-application components impacted by the fault occurrence and a fault recovery action associated with each of the one or more service-application components. At block 430, it determined whether a fault recovery plan response is received. The fault recovery plan response is an acknowledgement from the tenant of the fault recovery plan. The fault recovery plan may also be executed upon expiration of a predefined time limit in the fault recovery plan.

Turning now to FIG. 5, a flow diagram is provided that illustrates a method 500 for coordinating, between a host and a tenant, fault recovery of tenant infrastructure in a distributed system. At block 510, a fault recovery plan for a fault occurrence is received. The fault recovery plan may include a predefined time limit for tenant to respond to the fault recovery plan. At block 520, a tenant infrastructure impact associated with the fault recovery plan is determined. The tenant infrastructure impact triggers one or more tenant recovery actions. The one or more tenant recovery actions may be an automated recovery action associated with the tenant infrastructure. The tenant recovery actions may be based on service level agreements between a tenant and users of a service application impacted by the fault occurrence. At block 530, the one or more tenant recovery actions are executed. In embodiments, the tenant may communicate a fault recovery plan response and also receive a post fault recovery notification that includes a tenant infrastructure health report.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when used by one or more computing devices, cause the one or more computing devices to perform a method for coordinating fault recovery of tenant infrastructure in a distributed system, the method comprising:

determining a fault occurrence using a fault handler for a tenant infrastructure in the distributed system;

communicating a fault recovery plan to notify a tenant, wherein the fault recovery plan comprises one or more service-application components impacted a fault recovery action associated with the one or more service-application components, and a predefined time limit to respond to the fault recovery plan;

determining whether a fault recovery plan response is received, wherein the fault recovery plan response is an acknowledgement from the tenant of the fault recovery plan; and executing the fault recovery plan to restore the tenant infrastructure based on receiving the fault recovery plan response.

2. The media of claim 1, wherein determining the fault occurrence is based on monitoring the tenant infrastructure using the fault handler to periodically poll for up-to-date health report of the tenant infrastructure.

3. The media of claim 1, wherein determining the fault occurrence is based on receiving communication of the fault occurrence from a tenant role.

4. The media of claim 3, wherein the tenant is a management role associated with a plurality of tenant service-application components.

5. The media of claim 1, wherein the fault occurrence is associated with a plurality of tenants such that the fault recovery plan accounts for a service level agreement for each of the plurality of tenants.

6. The media of claim 1, wherein the fault recovery plan is based at least in part on a service level agreement between the host and the tenant.

7. The media of claim 6, wherein the service level agreement comprises an update policy for the tenant infrastructure.

8. The media of claim 1, wherein the fault recovery plan is executed when the fault recovery plan response is not received within the predefined time limit.

9. The media of claim 1, wherein the executing the fault recovery plan comprises performing an in-place fault recovery action, wherein the in-place fault recovery action comprises at least one fault recovery action selected from the following:
a reboot; an OS reimage; and a data reimage.

10. The media of claim 1, wherein the fault recovery plan is generated based at least in part on maintaining availability of the tenant infrastructure.

11. The media of claim 1, further comprising:
communicating a post fault recovery notification to each of the plurality of tenants; and
receiving a tenant infrastructure health report, wherein the tenant infrastructure health report is associated with one or more service applications of each of the plurality of tenants.

12. The media of claim 1, further comprising:
communicating a post fault recovery notification; and
receiving a tenant infrastructure health report, wherein the tenant infrastructure health report is associated with one or more post fault recovery actions.

13. A method for coordinating fault recovery of tenant infrastructure in a distributed system, the method comprising:
receiving a fault recovery plan for a fault occurrence, wherein the fault recovery plan comprises one or more service-application components impacted, a fault recovery action associated with the one or more service-application components, and a predefined time limit to respond to the fault recovery plan;
determining a tenant infrastructure impact associated with the fault recovery plan, wherein the tenant infrastructure impact triggers one or more tenant recovery actions; and
executing the one or more tenant recovery actions.

14. The method of claim 13, wherein the fault recovery plan is executed when a fault recovery plan response is not received within the predefined time.

15. The method of claim 13, wherein determining the tenant infrastructure impact is based on service level agreements between a tenant and users of a service application impacted by the fault occurrence.

16. The method of claim 13, wherein the one or more tenant recovery actions is an automated recovery action associated with the tenant infrastructure impact.

17. The method of claim 13, further comprising:
communicating a fault recovery plan response;
receiving a post fault recovery notification, wherein the post fault recovery notification comprises a tenant infrastructure health report; and
executing one or more post fault recovery actions based on at least in part on the tenant infrastructure health report.

18. A system for coordinating fault recovery of tenant infrastructure in a distributed system, the system comprising:
a controller component configured for:
determining a fault occurrence for infrastructure in the distributed system, wherein the fault occurrence is associated with a plurality of tenants;
communicating a fault recovery plan to notify the each of the plurality of tenants, wherein the fault recovery plan comprises one or more service-application components impacted, a fault recovery action associated with the one or more service-application components, and a predefined time limit to respond to the fault recovery plan;
determining whether a fault recovery plan response is received from each of the plurality of tenants, wherein the fault recovery plan response is an acknowledgement from each of the plurality of tenants of the fault recovery plan; and
executing the fault recovery plan to restore the infrastructure based on receiving the fault recovery plan response;
a tenant management role configured for:
receiving the fault recovery plan for the fault occurrence;
determining a tenant infrastructure impact associated with the fault recovery plan, wherein the tenant infrastructure impact triggers one or more tenant recovery actions;
communicating the fault recovery plan response; and
executing the one or more tenant recovery actions.

19. The system of claim 18, wherein the controller component is further configured for:
communicating a post fault recovery notification to each of the plurality of tenants; and
receiving a tenant infrastructure health report, wherein the tenant infrastructure health report is associated with one or more service applications of each of the plurality of tenants.

20. The system of claim 18, wherein the tenant management role is further configured for:
receiving a post fault recovery notification, wherein the post fault recovery notification triggers generating a tenant infrastructure health report; and executing one or more post fault recovery actions based on at least in part on the tenant infrastructure health report.

* * * * *